(12) United States Patent
Kohigashi et al.

(10) Patent No.: US 8,234,948 B2
(45) Date of Patent: Aug. 7, 2012

(54) TRANSMISSION

(75) Inventors: Kenta Kohigashi, Wako (JP); Tomoaki Ishikawa, Wako (JP); Kazuyoshi Miyahara, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 620 days.

(21) Appl. No.: 12/468,375

(22) Filed: May 19, 2009

(65) Prior Publication Data

US 2009/0288514 A1 Nov. 26, 2009

(30) Foreign Application Priority Data

May 21, 2008 (JP) .................. 2008-133696

(51) Int. Cl.
*F16H 1/20* (2006.01)
*F16H 57/02* (2006.01)
*F16H 37/06* (2006.01)
*F16H 9/00* (2006.01)

(52) U.S. Cl. .......... 74/424; 74/424.6; 74/425; 74/606 R; 74/665 GA; 474/4

(58) Field of Classification Search ................ 74/412 R, 74/416, 424, 424.6, 425, 606 R, 665 GA, 74/665 GE; 474/4

See application file for complete search history.

(56) References Cited

U.S. PATENT DOCUMENTS

| | | | | |
|---|---|---|---|---|
| 4,736,652 A | * | 4/1988 | Shimamoto | ............... 74/665 GE |
| 4,817,458 A | * | 4/1989 | Akutagawa et al. | ...... 74/665 GE |
| 5,768,656 A | * | 6/1998 | Nagasue et al. | ................ 399/75 |
| 6,422,107 B1 | * | 7/2002 | Kidokoro et al. | ............ 74/473.3 |
| 6,780,132 B2 | * | 8/2004 | Cook et al. | ..................... 475/149 |

FOREIGN PATENT DOCUMENTS

| | | |
|---|---|---|
| JP | 61-14254 U | 1/1986 |
| JP | 62-255665 A | 11/1987 |
| JP | 63-223207 A | 9/1988 |
| JP | 10-331959 A | 12/1998 |

* cited by examiner

*Primary Examiner* — Justin Krause
*Assistant Examiner* — Adam D Rogers
(74) *Attorney, Agent, or Firm* — Arent Fox LLP (57) ABSTRACT

A transmission has a movable transmission part movably connected to a fixed transmission part via a shaft to undergo pivotal movement relative to the fixed transmission part about an axis of the shaft. Each of the transmission parts has a hollow cylindrical connecting portion through which the shaft extends. One of the connecting portion of the movable transmission part and the connecting portion of the fixed transmission part is received in the other of the connecting portions with a single seal member disposed therebetween so that an internal space of the fixed transmission part and an internal space of the movable transmission part communicate with each other to thereby form a single hermetically-sealed space for holding therein a lubricating oil.

3 Claims, 12 Drawing Sheets

TRANSMISSION

FIELD OF THE INVENTION

The present invention relates generally to a transmission, and more particularly to a composite transmission having a fixed transmission part and a movable transmission part movably connected to the fixed transmission part via a shaft to undergo pivotal movement relative to the fixed part about an axis of the shaft.

BACKGROUND OF THE INVENTION

Conventional transmissions are configured to receive power from an engine via an input shaft thereof and transmit the engine power from an output shaft thereof to a crawler traveling unit for driving the crawler traveling unit. A typical example of such conventional transmissions is disclosed in Japanese Patent Laid-open Publication (JP-A) No. 63-223207.

The disclosed transmission has an input shaft adapted to be connected to an engine, a series of shift gears connected in driven relation to the input shaft, an output shaft connected in driven relation to a final shift gear of the series of shift gears, a clutch coupled with the output shaft, and a reduction gear connected to the clutch. The reduction gear is mounted to a drive shaft connected to a crawler traveling unit. The transmission includes a fixed lower transmission part including the shift gears, and a movable upper transmission part including the clutch and the reduction gear. The upper and lower transmission parts are connected together via the drive shaft. The upper and lower transmission parts are manufactured as structurally independent separate units and, when they are assembled together, a longitudinal part of the drive shaft is exposed between the upper and lower transmission parts or units. Each of the upper and lower transmission units requires a seal member for hermetically holding a lubricating oil within the respective transmission unit and a breather chamber and a breather passage that are provided for ventilation in a housing of the respective transmission unit.

The conventional transmission of the foregoing construction is relatively large in size and requires a relatively large number of components which will render the transmission complicated in construction and costly to manufacture. Furthermore, due to the presence of the exposed longitudinal portion, the drive shaft rusts easily.

With the foregoing drawbacks of the prior art in view, an object of the present invention is to provide a transmission, which is compact in size and requires a relatively small number of components, making the transmission simple in construction and less costly to manufacture.

SUMMARY OF THE INVENTION

According to the present invention, there is provided a transmission comprising: a fixed transmission part having an internal space defined therein; and a movable transmission part having an internal space defined therein, the movable transmission part being movably connected to the fixed transmission part via a shaft such that the movable transmission part is pivotally movable relative to the fixed transmission part about an axis of the shaft, the shaft being rotatably mounted to the fixed and movable transmission parts. The fixed transmission part has a hollow cylindrical first connecting portion through which the shaft extends, and the movable transmission part has a hollow cylindrical second connecting portion through which the shaft extends. One of the first connecting portion and the second connecting portion is received in the other of the first and second connecting portions with a single seal member disposed between the first and second connecting portions so that the internal space of the fixed transmission part and the internal space of the movable transmission part communicate with each other to thereby form a single hermetically-sealed space for holding therein a lubricating oil.

With this arranged, since the first mounting portion and the second mounting portion overlap each other in an axial direction thereof (which is parallel to the axis of the shaft), the fixed transmission part and the movable transmission part come close to each other and, hence, a size of the transmission in an axial direction of the shaft can be reduced.

Furthermore, by virtue of the single seal member provided between the first and second connecting portions, it is possible to reduce a number of necessary components of the transmission as compared to the conventional transmission which requires two seal members each disposed between the shaft and a respective one of the fixed and movable transmission units. Reduction in the number of necessary components leads to cost-cutting of the transmission.

The transmission may further include a position holding mechanism for holding the movable transmission part in a predetermined rotational position relative to the fixed transmission part. The position holding mechanism has a positioning pin provided on the movable transmission part and extending parallel to the shaft, a reference pin provided on the fixed transmission part and extending parallel to the shaft, a pair of position holding plates pivotally connected at one end to a portion of the movable transmission part for undergoing pivotal movement about the axis of the shaft, the position holding plates being configured to hold the positioning pin and the reference pin at an opposite end thereof, and a spring acting between the pair of position holding plates to urge the position holding plates toward each other.

Preferably, the movable transmission part is disposed above the fixed transmission part and has a breather chamber defined therein and connected with the single hermetically-sealed space in the transmission, and a breather passage for communicating the breather chamber with the air outside the transmission. With the breather chamber and the breather passage thus provided, it is possible to ventilate the movable and fixed transmission parts of the transmission. The breather passage preferably includes a breather pipe having one end connected to the breather chamber, and a breather hose having one end connected to another end of the breather pipe and another end facing in a vertical downward direction.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
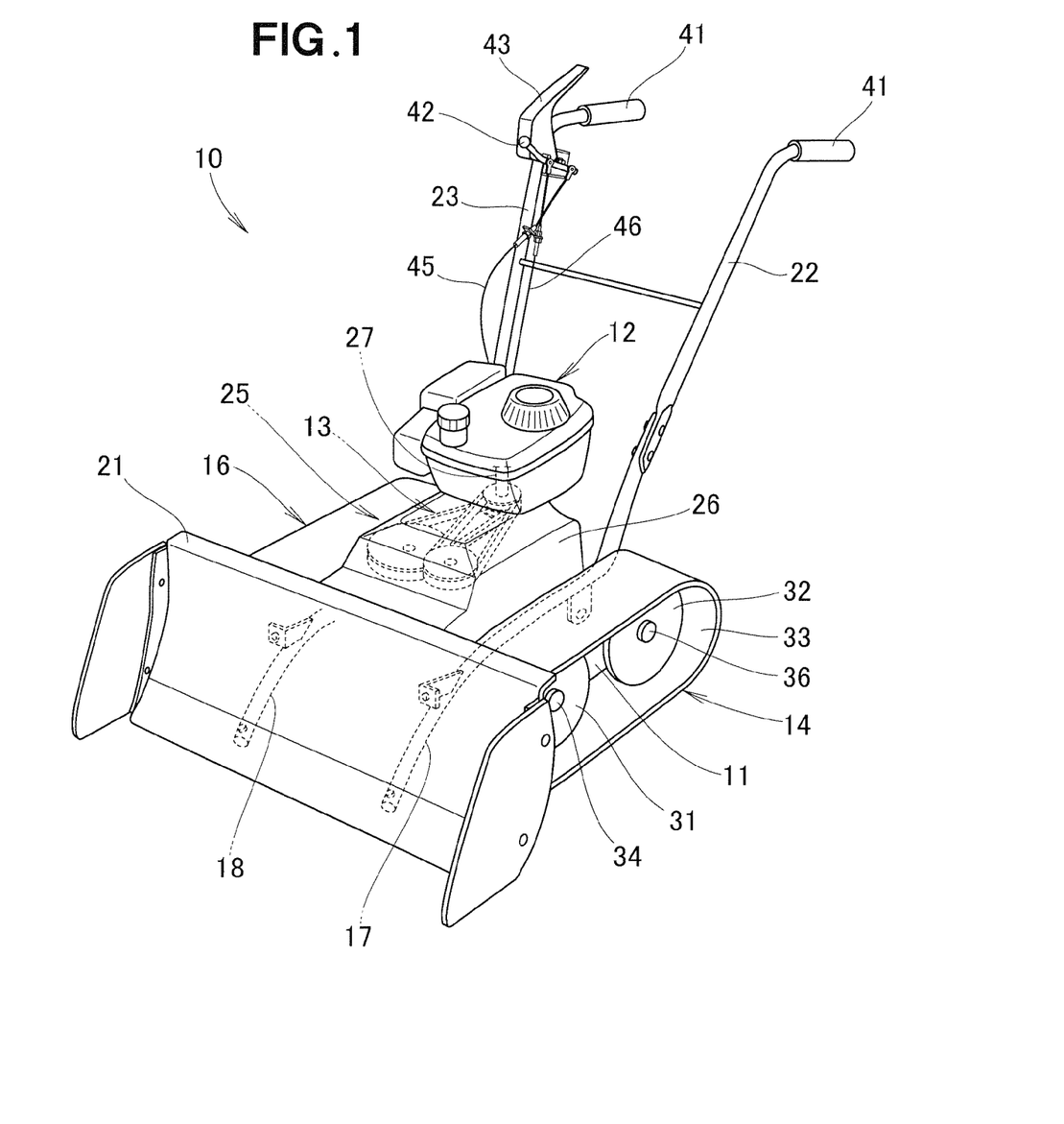
FIG. 1 is a perspective view of a small-sized snow removing machine in which a transmission embodying the present invention is incorporated.

Referring now to the drawings and FIG. 1 in particular, there is shown a small-sized snow removing machine 10 incorporating therein a transmission 13 according to one preferred embodiment of the present invention. The snow removing machine 10 generally comprises a body 11, an engine 12 mounted on the body 11, the transmission 13 mounted on the body 11 for transmitting power from the engine 12 to a pair of (left and right) crawler traveling units 14 and 16, a pair of (left and right) swing pipes 17 and 18 pivotally connected to the body 11, a snow removing blade 21 connected to front end portions of the respective swing pipes 17, 18, and a pair of (left and right) handlebars 22 and 23 connected to rear ends of the respective swing pipes 17, 18 and extending upwardly rearwards of the body 11. The transmission 13 is incorporated in a power transmission device 25 which is configured to transmit power from the engine 12 to the left and right crawler traveling units 14, 16. The transmission 13 is covered or concealed by a cover 26.

The engine 12 is a vertical engine having a crankshaft 27 disposed vertically. The left crawler traveling unit 14 includes a driving wheel 31 disposed behind the snow removing blade 21, an idler wheel 32 disposed rearward of the driving wheel 31, a crawler belt 33 trained around the driving and idler wheels 31, 32, a driving shaft 34 fixed to the driving wheel 31 and connected to the transmission 13, and a driven shaft 36 rotatably supporting thereon the idler wheel 32. The right crawler traveling unit 16 is disposed symmetrically with the left crawler traveling unit 14 about a longitudinal centerline of the snow removing machine 10 and has the same structure as the left crawler traveling unit 14 and, hence, a further description of the right crawler traveling unit 16 can be omitted.

The left and right handlebars 22, 23 each have a grip 41 at an end thereof. The right handlebar 23 is provided with a forward/reverse travel switching lever 42 for switching the travel direction of the snow removing machine 10 between a forward traveling direction and a reverse traveling direction, and a lock lever 43 for locking the forward/reverse travel switching lever 42 in position against pivotal movement relative to the right handlebar 23. The forward/reverse travel switching lever 42 is connected to the transmission 13 by means of first and second cables 45 and 46.

Figure 2:
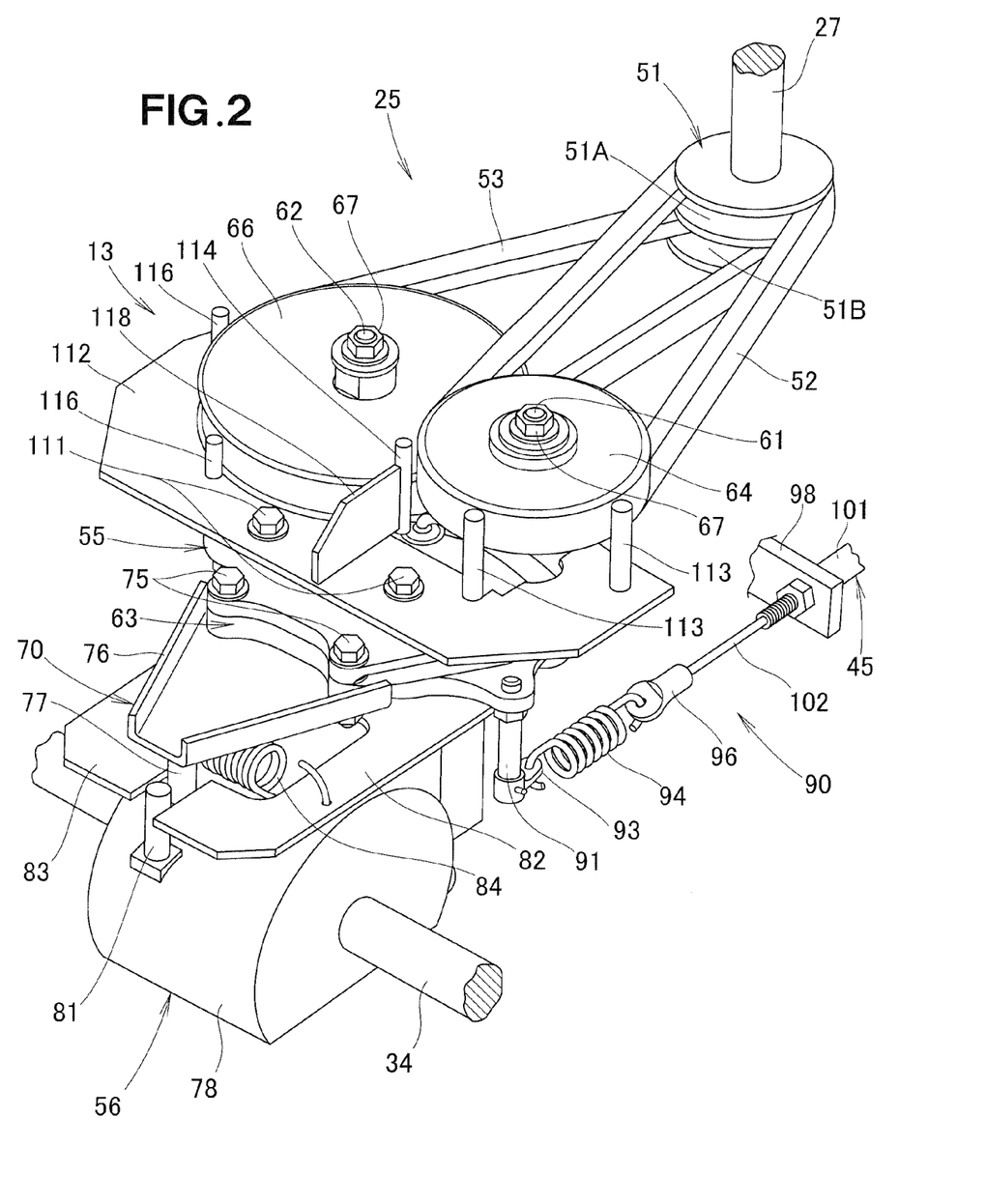
FIG. 2 is a perspective view of the transmission.

FIG. 2 shows in perspective the power transmission device 25 in which the transmission 13 is incorporated. As shown in this figure, the power transmission device 25 includes a driving pulley 51 fixedly connected to a lower end of the crankshaft 27 of the engine 12 (FIG. 1), two V-belts 52, 53 trained around the driving pulley 51, and the transmission 13 connected in driven relation to the driving pulley 51 via the V-belts 52, 53.

The transmission 13 includes an upper transmission part 55 connected to the V-belts 52, 53, and a lower transmission part 56 disposed below the upper transmission part 55. The upper transmission part 55 is mounted to undergo pivotal movement about a drive shaft 121 (FIG. 5) disposed vertically in the lower transmission part 56. The lower transmission part 56 is fixedly mounted to the body 11 of the snow removing machine 10 and connected to the driving shaft 34 of the left and right crawler traveling units 14, 16 (FIG. 1). Thus, the upper transmission part 55 is a movable transmission part, while the lower transmission part 56 is a fixed transmission part. The driving pulley 51 is a one-piece member and has two V grooves 51A and 51B on its outer circumferential surface for receiving the V-belts 52 and 53, respectively.

The upper transmission part 55 includes a housing 63 and first and second input shafts 61 and 62 disposed vertically and rotatably mounted to the housing 63. A first pulley 64 is attached by a nut 67 to an upper end of the first input shaft 61, and a second pulley 66 is attached by a nut 67 to an upper end of the second input shaft 62. The V-belt 52 extends between the driving pulley 51 and the first pulley 64, and the V-belt 53 extends between the driving pulley 51 and the second pulley 66.

The transmission 13 further includes a position holding mechanism 70 for holding the upper transmission part 55 in a predetermined rotational position relative to the lower transmission part 56. The position holding mechanism 70 has a bracket 76 attached by a pair of bolts 75 to a front portion of the housing 63 of the upper transmission part 55, a positioning pin 77 extending vertically downward from a front end portion of the bracket 76, a reference pin 81 extending vertically upward from a front portion of a housing 78 of the lower transmission part 55, a pair of (left and right) position holding plates 82 and 83 pivotally connected at one end to a lower portion of the upper transmission part 55 and holding the pins 77, 81 at the other end thereof, and a tension coil spring 84 acting between the position holding plates 82, 83 to urge the position holding plates 82, 83 toward each other. The positioning pin 77 and the reference pin 88 extend parallel to the drive shaft 121.

The predetermined rotational position in which the upper transmission part 55 is held by the position holding mechanism 70 corresponds to a neutral position of the power transmission device 25 where the V-belt 52, 53 become slack and cannot transmit the power from the engine 12 (FIG. 1) to the input shafts 61, 62 of the transmission 13. The upper transmission unit 55 is normally held in the predetermine position (i.e., neutral position of the power transmission device 25) by means of the position holding mechanism 70. As will be understood from a description given below, when a force tending to turn the upper transmission part 55 relative to the lower transmission part 56 is released, the upper transmission part 55 is automatically returned to the neutral position by the spring force or resiliency of the tension coil spring 84 of the position holding mechanism 70.

The transmission 13 also includes an actuating mechanism 90 for actuating the upper transmission part 55 to pivot or turn relative to the lower transmission part 56. The actuating mechanism 90 has a pair of (left and right) pins 91 and 92 (FIG. 3) extending vertically downward from left and right ends of the housing 63 of the upper transmission part 55, an attachment lug 93 connected to each of the pins 91, 92, a tension coil spring 94 connected between 5 the attachment lug 93 and a wire end fitting 96 connected to an end of each of the first and second cables 45, 46 (FIG. 1), the first and second cables 45, 46 (FIG. 1), the forward/reverse travel switching lever 42 (FIG. 1) and the lock lever 43 (FIG. 1).

The first cable 45 includes an outer cable 101 supported at one end to a cable support stay 98 mounted to the body 11 (FIG. 1) of the snow removing machine 10, and an inner wire 102 movably received in the outer cable 101 and having one end connected to the wire end fitting 96. The second cable 46 (FIG. 1) is structurally the same as the first cable 45 and a further description thereof can be omitted.

The upper transmission part 55 includes a horizontal flat plate 112 connected to an upper surface of the housing 63 of the upper transmission part 55 by a plurality of bolts 111 (two being shown), and a plurality of pins 113, 114, 116 projecting vertically upward from an upper surface of the flat plate 112 for preventing the V-belts 52, 53 from slipping off the associated pulleys 64, 66. The pin 114 is attached to the flat plate 112 via a vertical support wall 118 provided on the upper surface of the support plate 112.

It will be appreciated that the transmission 13 generally comprises the upper transmission part 55, the lower transmission part 56, the actuating mechanism 90 for actuating the upper transmission part 55 to undergo pivotal movement relative to the lower transmission part 56 between a first position in which either of the V-belts 52, 53 is in a stretched state, and a second position in which both of the V-belts 52, 53 are in a slacked state, and the position holding mechanism 70 for holding the upper transmission part 55 in a neutral position in which both V-belts 52, 53 are disposed in the slacked position and hence they cannot transmit power from the engine crankshaft 27 to the inputs shaft 61, 62 of the transmission 13.

Figure 3:
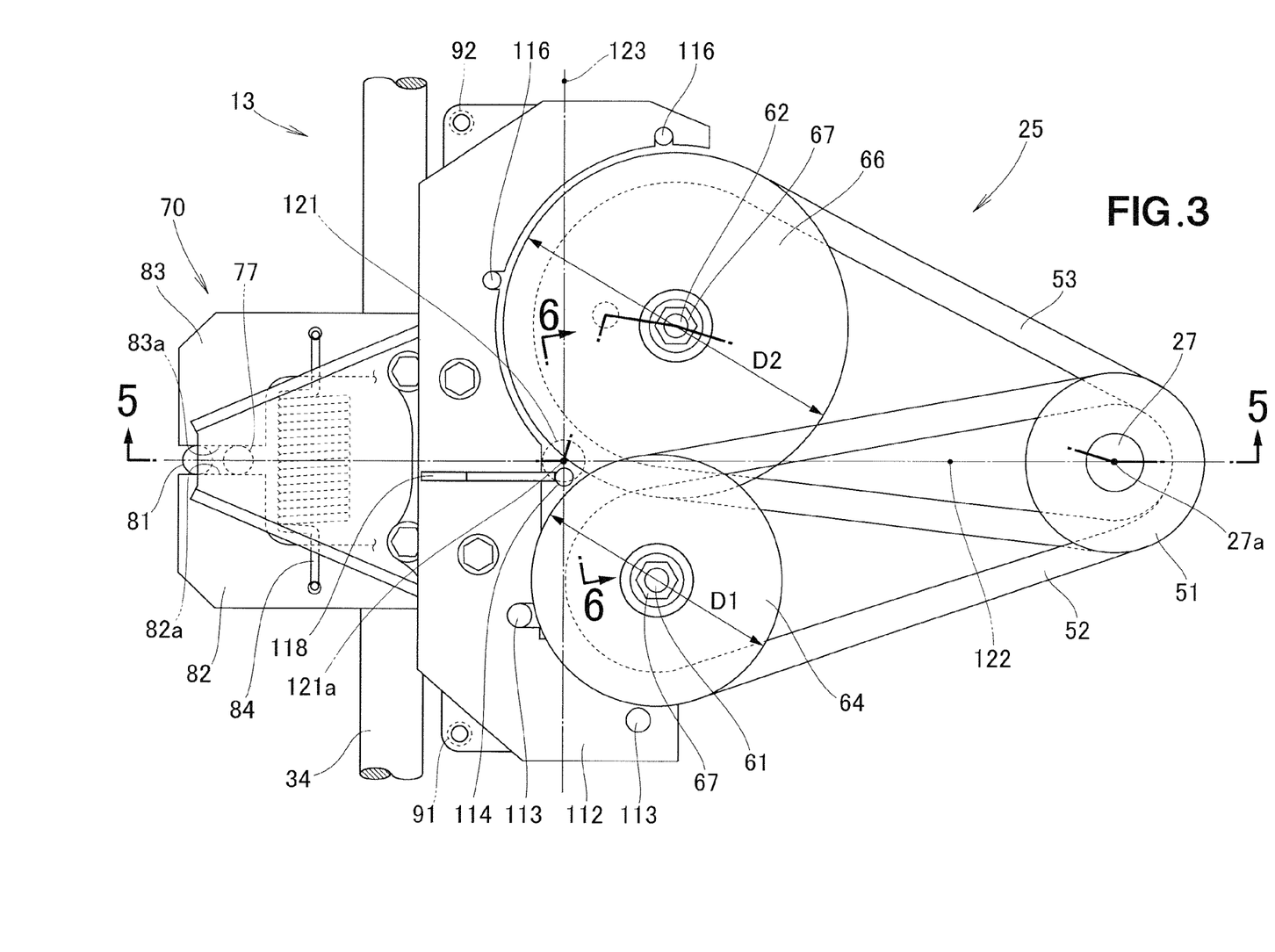
FIG. 3 is a plan view of the transmission.

As shown in FIG. 3, the first input shaft 61 of the transmission 13 is disposed on a left side of a centerline 122 extending in a longitudinal or front-back direction of the snow removing machine 10 (FIG. 1) so as to connect an axis 27a of the crankshaft 27 of the engine 12 (FIG. 1) and an axis 121 of the drive shaft 121 of the transmission 13 as viewed in a plan view, and the second input shaft 62 is disposed on a left side of the centerline 122. The first pulley 64 attached to the first input shaft 61 has an outside diameter D1, which is smaller than an outside diameter D2 of the second pulley 66 attached to the second input shaft 62. Reference numeral 123 denotes a reference line passing through the axis 121a of the drive shaft 121 and being orthogonal to the centerline 122.

The first pulley 64 is provided for undertaking power transmission during forward traveling of the snow removing machine 10 (FIG. 1) while the second pulley 66 is provided for undertaking power transmission during reverse traveling of the snow removing machine 10 (FIG. 1). The outside diameter D2 of the second pulley 66 is made larger than the outside diameter D1 of the first pulley 64 so as to provide a larger reduction ratio than the first pulley 64 to thereby achieve a reverse traveling speed of the snow removing machine 10 (FIG. 1) which is slower than a forward traveling speed of the snow removing machine.

The positioning pin 77 and the reference pin 81 of the position holding mechanism 70 are disposed in lateral juxtaposition along the centerline 122 and they are normally held between respective retaining surfaces 82a, 83a of the position holding plates 82, 83 under the effect of a spring force or resiliency of the tension coil spring 84.

The reference pin 81 is fixed at a position located at the centerline 122, whereas the positioning pin 77 is movable in a lateral outward direction of the centerline 122 when the upper transmission part 55 is turned either clockwise or counterclockwise about the axis 121a of the drive shaft 121 against the force of the tension coil spring 84. When a force tending to turn the upper transmission part 55 is released, the positioning pin 77 is automatically returned to the original position on the centerline 122 by means of one of the position holding plates 82, 83 as the one position holding plate pivots toward the other position holding plate by the force of the tension coil spring 84.

Figure 4:
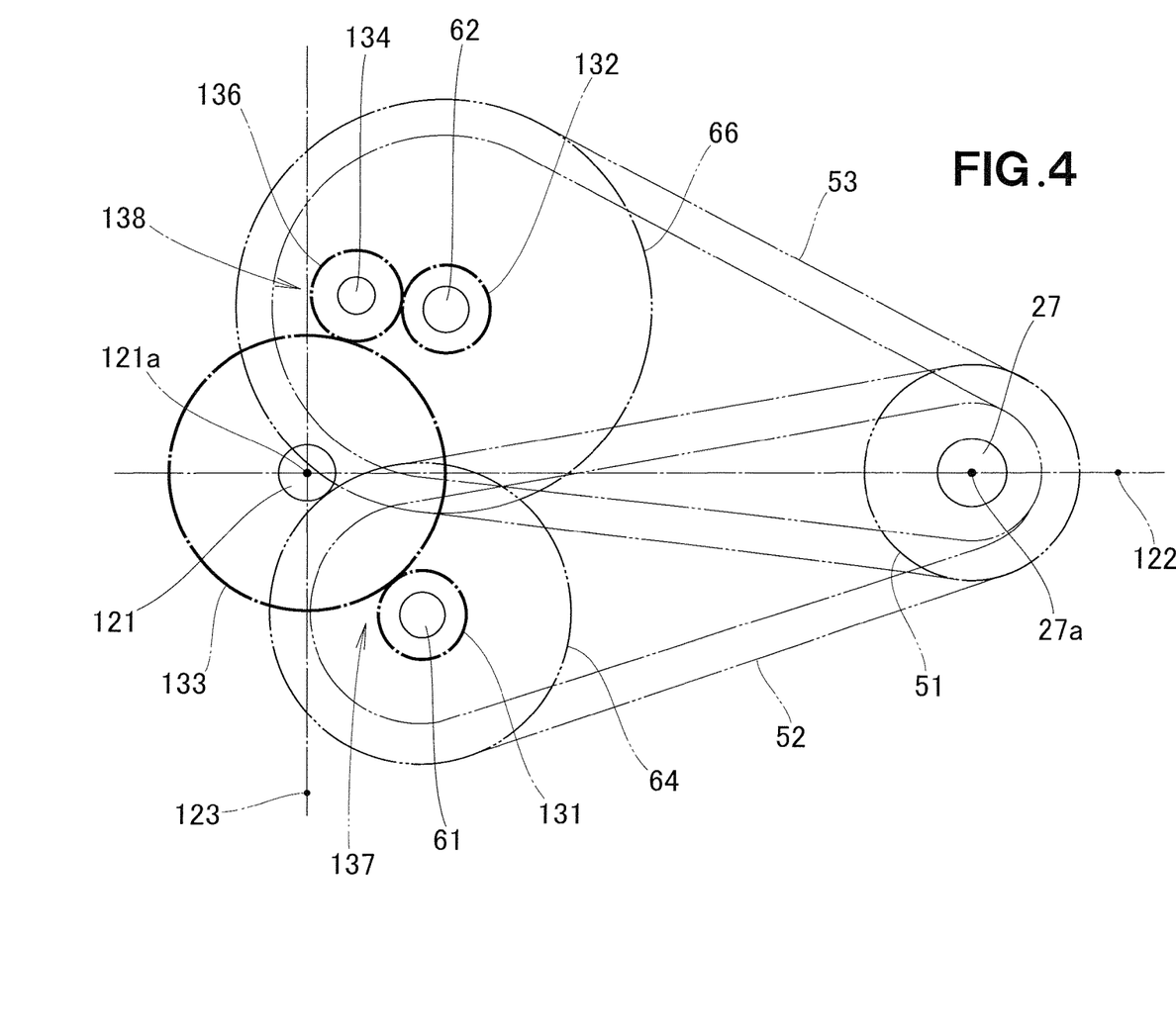
FIG. 4 is a diagrammatical view showing a power transmitting path of a power transmission device in which the transmission is incorporated.

FIG. 4 diagrammatically shows a power transmitting path of the power transmission device 25 in which the transmission 13 is incorporated. As shown in this figure, the first input shaft 61 has a first driving gear 131 mounted thereon for rotation with the first input shaft 61, the second input shaft 62 has a second driving gear 132 mounted thereon for rotation with the second input shaft 62, and the drive shaft 121 has a driven gear 133 mounted thereon for rotation with the drive shaft 121. The first driving gear 131 and the second driving gear 132 have the same number of teeth.

The first driving gear 131 is in mesh with the driven gear 133, and the second driving gear 131 is in mesh with an idler gear 136 which is mounted on an idler shaft 134, the idler gear 136 being in mesh with the driven gear 133. The idler gear 136 has the same number of teeth as the first and second driving gears 131, 132. The idler shaft 134 is mounted to the housing 63 (FIGS. 3 and 5) of the upper transmission part 55 and disposed at a position which is located forward of the second input shaft 62 and rearward of the drive shaft 121.

The first driving gear 131 and the driven gear 133 form a first gear set or train 137 for rotating the drive shaft 121 in a forward direction (clockwise direction in FIG. 4). The second driving gear 132, the idler gear 134 and the drive gear 133 form a second gear set or train 138 for rotating the drive shaft 121 in a reverse direction (counterclockwise direction in FIG. 4).

During forward traveling of the snow removing machine 10 (FIG. 1), power of the engine 12 (FIG. 1) is transmitted from the crankshaft 27 to the drive shaft 121 successively through the driving pulley 51, the V-belt 52, the first pulley 64, the first input shaft 61, the first driving gear 131, and the driven gear 133. Thus, the engine power is transmitted from the first input shaft 61 through the first gear train 137 to the drive shaft 121.

During reverse traveling of the snow removing machine 10 (FIG. 1), the engine power is transmitted from the crankshaft 27 to the drive shaft 121 successively through the driving pulley 51, the V-belt 53, the second pulley 66, the second input shaft 62, the second driving gear 132, the idler gear 136, and the driven gear 133. Thus, the engine power is transmitted from the second input shaft 62 through the second gear train 138 to the drive shaft 121.

Figure 5:
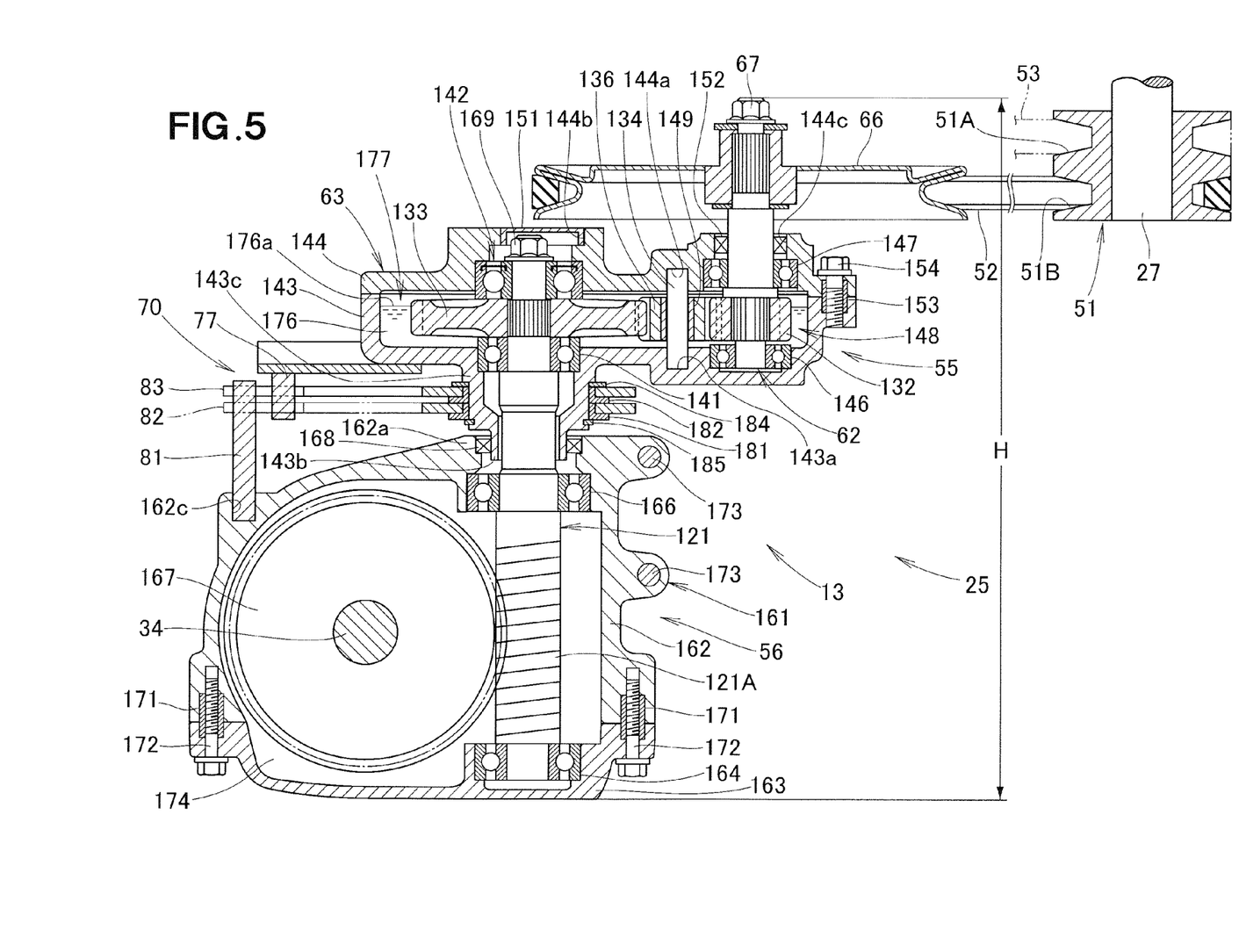
FIG. 5 is a cross-sectional view taken along line 5-5 of FIG. 3.

As shown in FIG. 5, the power transmission device 25 includes the driving pulley 51, the V-belts 52, 53, and the transmission 13 driven by the V-belts 52, 53. The transmission 13 includes the upper transmission part 55, the lower transmission part 56, the position holding mechanism 70 and the actuating mechanism 90 (FIG. 2). The transmission 13 is operable to switch the traveling direction of the snow removing machine 10 between a forward traveling direction and a reverse traveling direction and also to set the power transmission device 25 in a neutral position where no power is transmitted from the engine crankshaft 27 to the drive shaft 121.

The housing 63 of the upper transmission part 55 is rotatably mounted on an upper part of the drive shaft 121 by means of a pair of bearings 141 and 142. The housing 63 is composed of a lower housing member 143 and an upper housing member 144 attached to an upper end of the lower housing member 143. The second input shaft 62 is rotatably mounted in the housing 63 via a pair of bearings 146 and 147. Though not shown in FIG. 5, the first input shaft 61 (FIG. 3) is rotatably mounted in the housing 63 via a pair of bearings. The idler shaft 134 is mounted in the housing 55 with its opposite ends fitted in a pair of opposed retaining holes 143a and 144a formed in the lower housing member 143 and the upper housing member 144, respectively. The first driving gear 31 (FIG. 4), the second driving gear 132, the idler gear 136 and the driven gear 133 are disposed in an internal space 148 of the upper transmission part 55 which is defined by the lower and upper housing members 143, 144 of the housing 55. The second driving gear 132 is spline-connected to a lower portion of the second input shaft 62 disposed between the bearings 146, 147. Though not shown in FIG. 5, the first driving gear 131 (FIG. 4) is spline-connected to a lower portion of the first input shaft 61 (FIGS. 3 and 4) disposed between the bearings. The idler gear 136 is rotatably mounted on the idler shaft 134 via a bushing or sleeve bearing 149. The driven gear 133 is spline-connected to the upper part of the drive shaft 121 between the bearings 141, 142. The second pulley 66 is spline-connected to an upper portion of the second driving shaft 62 projecting outwardly from the upper housing member 144 of the housing 63. Though not shown in FIG. 5, the first pulley 64 (FIGS. 3 and 4) is spline-connected to an upper portion of the first driving shaft 61 (FIGS. 3 and 4) projecting outwardly from the upper housing member 144 of the housing 63.

Reference numeral 151 shown in FIG. 5 denotes a cap fitted in an opening 144b of the upper housing member 144 to close the opening 144b. A seal member 152 is disposed between the second input shaft 62 and an opening 144c formed in the upper housing member 144 for the passage therethrough of the second input shaft 62. A collar 153 is provided for positioning the lower housing member 143 and the upper housing member 144 relative to each other, and a bolt 154 extends through the collar 153 and fastens together the lower and upper housing members 143 and 144.

The housing 161 of the lower transmission part 56 includes a generally barrel-shaped housing body 162 open downward, and a bottom cover member 163 attached to a lower end of the housing body 162 to close an opening of the housing body 162. The drive shaft 121 is rotatably mounted to the housing 161 via a pair of bearings 164 and 166. The drive shaft 121 has a worm 121A formed on a part of the drive shaft 121 extending between the bearings 164, 166. The worm 121A meshes with a worm wheel 167 mounted on the driving shaft 34 rotatably mounted to the housing 161. The worm 121a and the worm wheel 167 are disposed in an internal space 174 of the lower transmission part 56 which is defined by the housing body 162 and the bottom cover member 163 of the housing 161.

Reference numeral 171 shown in FIG. 5 denotes a plurality of positioning collars 171 (two being shown) provided to position the housing body 162 and the bottom cover member 163 of the housing 161 relatively to each other. A plurality of bolts 172 (two being shown) extends through respective ones of the collars 171 and fastens together the housing body 162 and the bottom cover plate 163. Reference numeral 169 denotes a nut threaded with an externally threaded upper end portion of the drive shaft 121 so as to prevent removal of the bearing 142 from the drive shaft 121. The housing body 162 is fixedly connected to the body 11 (FIG. 1) of the snow removing machine 10 (FIG. 1) by a plurality of bolts 173 (two being shown).

The lower transmission part 56 has a first connecting portion 162a of hollow cylindrical shape formed at an upper end portion of the housing body 162 of the housing 161. Similarly, the upper transmission part 55 has a second connecting portion 143b of hollow cylindrical shape formed at a lower end portion of the lower housing member 143 of the housing 63. The hollow cylindrical second connecting portion 143b has an outside diameter which is smaller than an inside diameter of the hollow cylindrical first connecting portion 162a. The second connecting portion 143b is loosely received in the first connecting portion 162a, and a single seal member 168 is disposed between the first and second connecting portions 162a, 143b to provide a hermetic seal therebetween so that the internal space 174 of the lower transmission part 56 and the internal space 148 of the upper transmission part 55 communicate with each other to thereby form a single hermetically-sealed space 177 for holding therein a lubricating oil 176. The lubricating oil 167 held in the space 177 has a level 176a, so that the first and second gear trains 137 and 138 disposed in the internal space 148 of the upper transmission part 55 and the worm 121A and the worm wheel 167 disposed in the internal space 174 of the lower transmission part 56 can be sufficiently lubricated with the lubricating oil 176.

As discussed above, the upper transmission part 55 and the lower transmission part 56 of the transmission 13 are connected together via the drive shaft 121 in such a manner that the hollow cylindrical connecting portion 143b of the upper transmission part 55 is received in the hollow cylindrical connecting portion 162a of the lower transmission part 56 with the single seal member 168 disposed between the connecting portions 143b, 162a. By virtue of the single seal member 168 provided between the connecting portions 143b, 162a of the upper and lower transmission parts 55, 56, it is possible to reduce a number of necessary components of the transmission 13 and simplify the structure of the transmission 13 as compared to the conventional transmission which requires two seal members each disposed between the drive shaft and a respective one of the upper and lower transmission parts or units.

Furthermore, since the connecting portions 143b, 162a of the upper and lower transmission parts 55, 56 overlap each other in an axial direction thereof (which is parallel to the axis of the drive shaft 121) so as to form a double tube construction, the upper and lower transmission parts 55, 56 come close to each other and, hence, a size of the transmission 13 in the axial direction of the drive shaft 121 (that is an overall height H of the transmission 13 shown in FIG. 5) can be reduced.

As shown in FIG. 5, the positioning pin 77 of the position holding mechanism 70 extends in a downward direction beyond the position holding plate 82 which is disposed below the position holding plate 83. The reference pin 81 is press-fitted in a retaining hole 162c formed in the housing body 162 of the lower transmission part 56 and extends in an upward direction beyond the position holding plate 83. The position holding plates 82, 83 are pivotally mounted on a hollow cylindrical portion 143c of the lower housing member 143 of the upper transmission part 55 via a pair of plate retaining members 181 and 182. Reference numeral 184 denotes a washer and reference numeral 185 denotes a stop ring.

Figure 6:
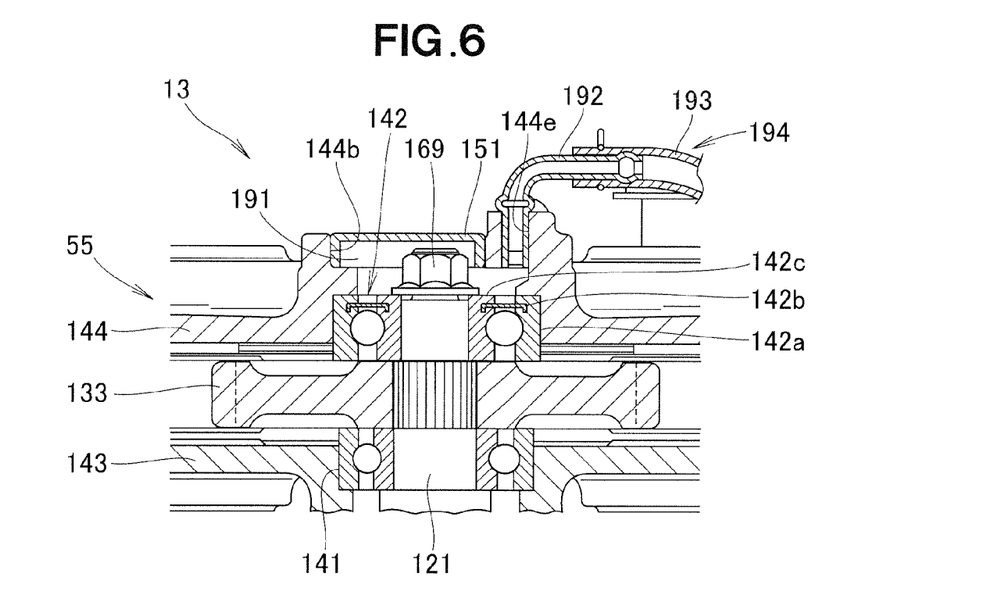
FIG. 6 is a cross-sectional view taken along line 6-6 of FIG. 3.

As shown in FIG. 6, a breather chamber 191 is defined jointly by the cap 151, an upper end portion of the upper housing member 144 including the opening 144b closed by the cap 151, the bearing 142 rotatably supporting the upper portion of the drive shaft 121 on the upper end portion of the upper housing member 144, the upper end portion of the drive shaft 121, and the nut 169 fastened to the upper end portion of the drive shaft 121. The upper end portion of the upper housing member 144 has a vertical hole 144e opening at one end to the breather chamber 191. An L-shaped breather pipe 192 has one end portion press-fitted in the vertical hole 144e of the upper housing member 144 and an opposite end portion connected to a breather hose 193. The breather pipe 192 and the breather hose 193 together form a breather passage 194 through which the breather chamber 191 communicates with the air outside the transmission 13.

The breather chamber 191 is partly defined by the bearing 142 and hence is subjected to a high temperature and an increased pressure that are developed within the breather chamber 191 as the temperature of the bearing 142 increases while the drive shaft 121 is rotating. However, since the breather chamber 191 communicates with the outside air through the breather passage 194, it is possible to lower the temperature and pressure of the breather chamber 191.

The bearing 142 is a sealed bearing having a seal plate 142b fixed to an outer race 142a of the bearing 142. The seal plate 142b and a groove formed in a seal surface of an inner race 142c of the bearing 142 together form a labyrinthine gap which is highly effective to prevent dust and dirt from getting into sliding portions of the bearing 142.

Figure 7:
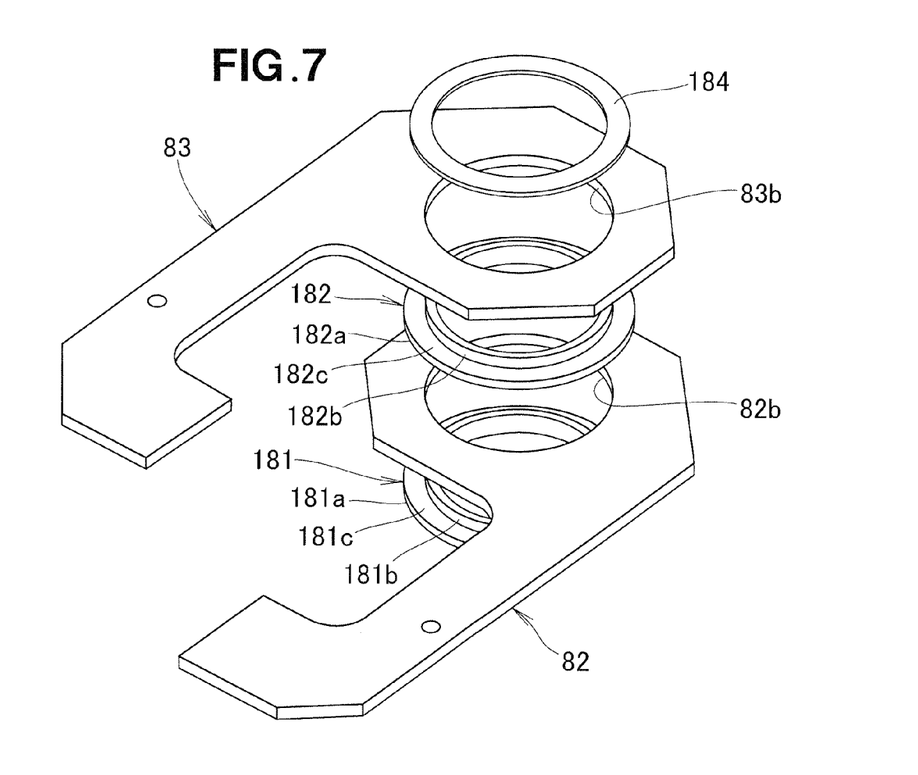
FIG. 7 is an exploded perspective view of a part of a position holding mechanism of the transmission.

FIG. 7 shows in exploded perspective a support structure for supporting the position holding plates 82, 83 of the position holding mechanism 70 (FIG. 5). The position holding plates 82, 83 each have a circular hole 82b, 83b formed at one end thereof. The plate retaining members 181, 182 each have a large-diameter portion 181a, 182a, a small-diameter portion 181b, 182b, and a step 181c, 182c formed between the large-diameter portion 181a, 182a and the small-diameter portion 181b, 182b.

The position holding plate 82 is placed on the step 181c of the plate retaining member 181 with its circular hole 82b slidably fitted with the small-diameter portion 181b of the plate retaining member 181. Similarly, the position holding plate 83 is placed on the step 182c of the plate retaining member 182 with its circular hole 83b slidably fitted with the small-diameter portion 182b of the plate retaining member 182. The washer 184 is placed on an upper surface of the position holding plate 83. With this arrangement, the plate retaining members 181, 182 have the function of a bushing. The position holding plate 82 is in slide contact with the plate retaining members 181, 182, and the position holding plate 83 is in slide contact with the plate retaining member 182 and the washer 184. The position holding plates 82, 83 are held out of contact with the lower housing member 143 (FIG. 5) of the upper transmission part 55.

Figure 8:
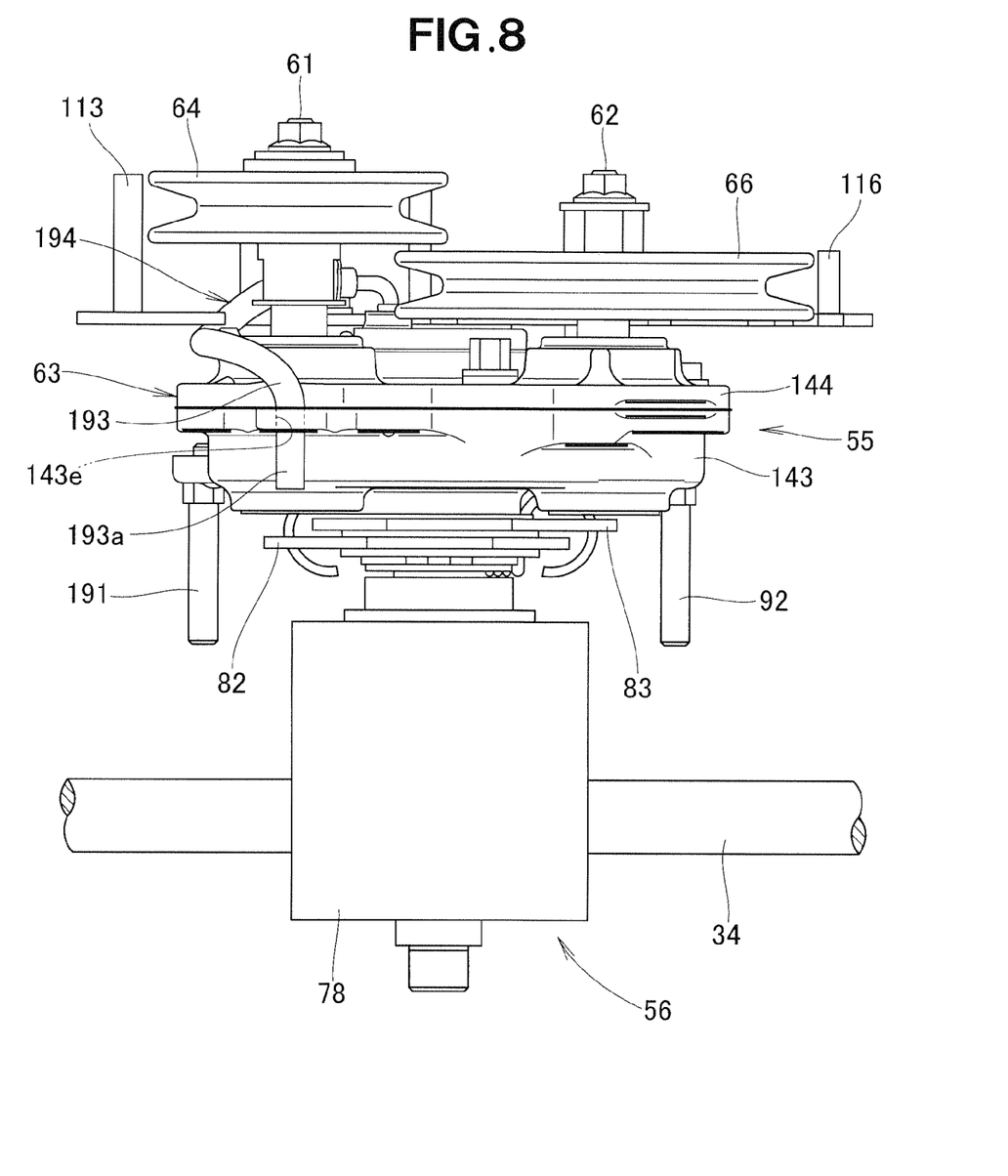
FIG. 8 is a rear elevational view of the transmission.

As shown in FIG. 8, the first pulley 64 is disposed at a higher level than the second pulley 66. The left and right pins 91, 92 of the actuating mechanism 90 (FIG. 2) are provided on left and right end portions of the lower housing member 143 of the housing 63 of the upper transmission part 55. The breather hose 193, which forms a part of the breather passage 194, has an outer end portion 193a inserted through a hose retaining hole 143e formed in a rear end portion of the lower housing member 143. The outer end portion 193a of the breather hose 193 opens downward so that the breather passage 194 has no risk of introducing rainwater.

Figure 9:
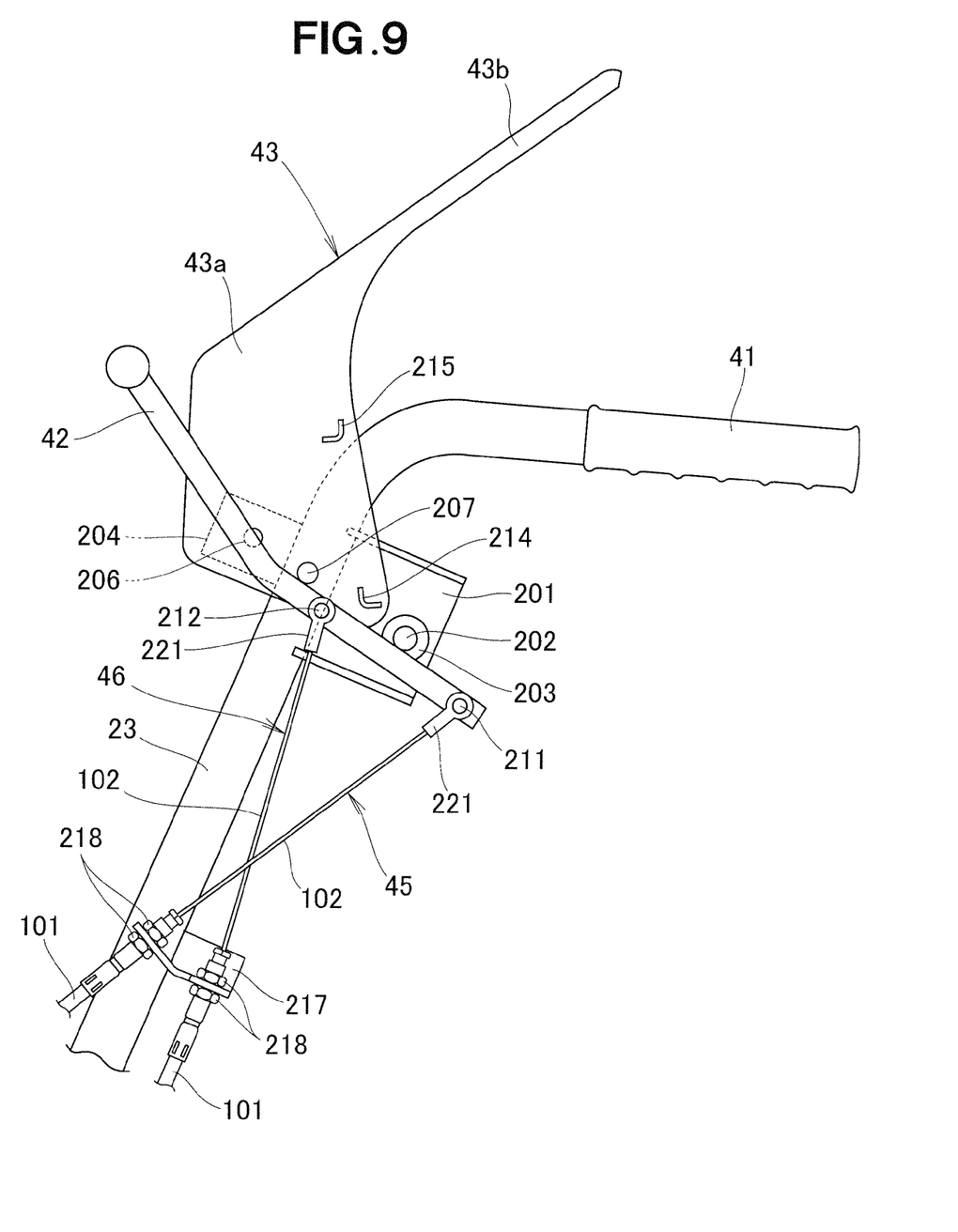
FIG. 9 is a side view showing an actuating mechanism associated with a handlebar for actuating a movable transmission part of the transmission to pivot or turn relative to a fixed transmission part of the transmission.

FIG. 9 shows in side elevation a portion a part of the actuating mechanism 90 (FIG. 2) associated with the right handlebar 23. The right handlebar 23 is provided with a rear bracket 201 projecting from the handlebar 23 in a backward direction of the snow removing machine 10 (FIG. 1), and a front bracket 204 projecting from the handlebar 23 in a forward direction of the snow removing machine 10 (FIG. 1). The rear bracket 201 has a pivot shaft 202 disposed horizontally. The forward/reverse travel switching lever 42 has a bearing portion or member 203 formed integrally therewith. The bearing member 203 is sidably fitted around the pivot shaft 202 so that the forward/reverse travel switching lever 42 is pivotally movable in a vertical plane about the pivot shaft 202. The first cable 45 is pivotally connected to a rear end portion of the forward/reverse travel switching lever 42 which is located rearward of the pivot shaft 202, and the second cable 46 is pivotally connected to an intermediate portion of the forward/reverse travel switching lever 42 which is located forward of the pivot shaft 202. The front bracket 204 has a pivot shaft 206 disposed horizontally, and the lock lever 43 is pivotally mounted on the pivot shaft 206.

The forward/reverse travel switching lever 42 has a locked portion 207 formed at a central portion thereof for locking engagement with a part of the lock lever 43 when the lock lever 43 locks the forward/reverse travel switching lever 42 in position again pivotal movement about the pivot shaft 202. Reference numerals 211 and 212 shown in FIG. 9 denote connecting pins provided on a side surface of the forward/reverse travel switching lever 42 for connection with the first and second cables 45, 46, respectively.

The lock lever 43 includes a mount portion 43a pivotally mounted on the pivot shaft 206, and a narrow grip portion 43b integral with and extending from the mount portion 43a for gripping by a human operator. The lock lever 43 has two locking lugs 214, 215 formed on a side surface thereof for locking engagement with the locked portion 207 of the forward/reverse travel switching lever 42. The locking lugs 214, 215 have an L-shaped configuration as viewed in a side elevation.

Each of the first and second cables 45, 46 is supported on a cable bracket 217 provided on the right handlebar 23, with the outer cable 101 of each respective cable 45, 46 fastened to the cable bracket 217 by a pair of nuts 218. The inner wire 102 of each cable 45, 46 is connected at an opposite end thereof to a wire end fitting 221, and the wire end fitting 211 of the first cable 45 is pivotally connected to the connecting pin 2 11 of the forward/reverse travel switching lever 42 while the wire end fitting 211 of the second cable 46 is pivotally connected to the connecting pin 212 of the forward/reverse travel switching lever 42.

Operation of the power transmission device 25 will be described below with reference to FIGS. 10A and 10B. When the forward/reverse travel switching lever 42 is disposed in a first position indicated by two-dot chain lines shown in FIG. 10A, the V-belts 52, 53 shown in FIG. 3 are placed in a slacked state even when the engine is running. Thus, no power is transmitted from the crankshaft 27 of the engine to the first and second input shafts 61, 62 of the transmission 13 with the result that the crawler traveling units 14, 16 shown in FIG. 1 remain stationary and the snow removing machine 10 is in a stopped state. In this condition, the transmission 13 is in a neutral position. The chain-lined first position of the forward/reverse travel switching lever 32 can be referred to as a neutral position.

Figures 10A, 10B:
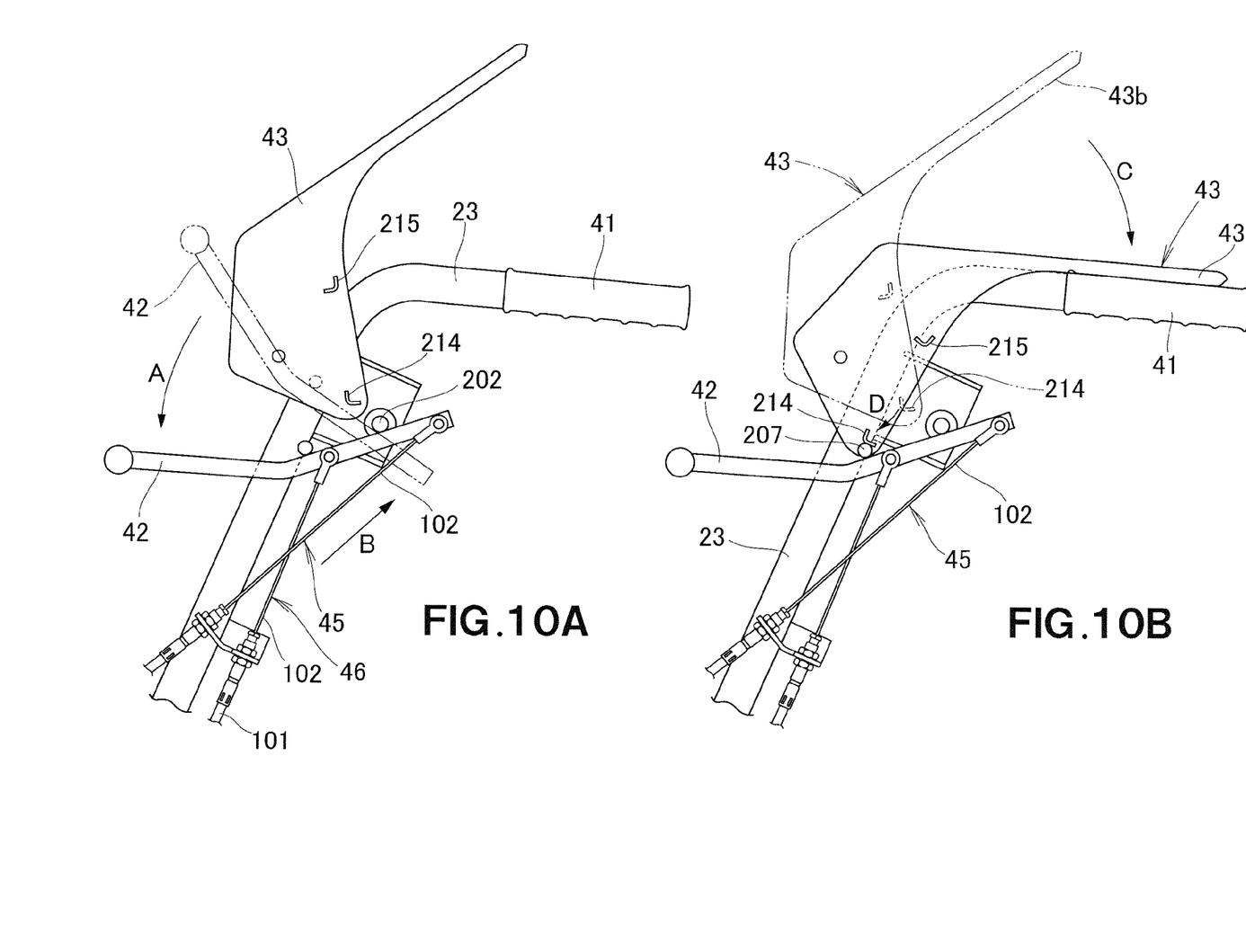
FIGS. 10A and 10B are diagrammatical side views illustrative of an operation of the transmission in conjunction with an operation of a part of the actuating mechanism associated with a handlebar of the snow removing machine when the snow removing machine is to be activated to travel forward.

When the snow removing machine is to be activated to travel in a forward direction, the forward/reverse travel switching lever 42 is tilted downward as indicated by an arrow A shown in FIG. 10A until it assumes a second position indicated by solid lines shown in FIG. 10A. With this movement of the forward/reverse travel switching lever 42, the inner wire 102 of the first cable 45 is pulled as indicated by an arrow B shown in FIG. 10A, and an inner wire 102 of the second cable 46 is drawn into the outer cable 101 of the second cable 46.

While the forward/reverse travel switching lever 42 is kept in the solid-lined downward tilted second position, the lock lever 43 is tilted down toward the grip 41 as indicated by an arrow C shown in FIG. 10B until it assumes a recumbent position lying flat on the grip 41 as indicated by solid lines shown in FIG. 10B. The lock lever 43 and the grip 41 of the right handlebar 23 are then gripped with a right hand of the human operator. With this movement of the lock lever 43, the locking lug 214 of the lock lever 43 is brought into locking engagement with the locked portion 207 of the forward/reverse travel switching lever 42 as indicated by an arrow D shown in FIG. 10B, so that the forward/reverse travel switching lever 42 is prevented from returning back toward the chain-lined first position (neutral position) shown in FIG. 10A. Thus, the forward/reverse travel switching lever 42 is locked in the solid-lined second position of FIG. 10B against pivotal movement in a clockwise direction shown in FIG. 10B.

Figure 11A:
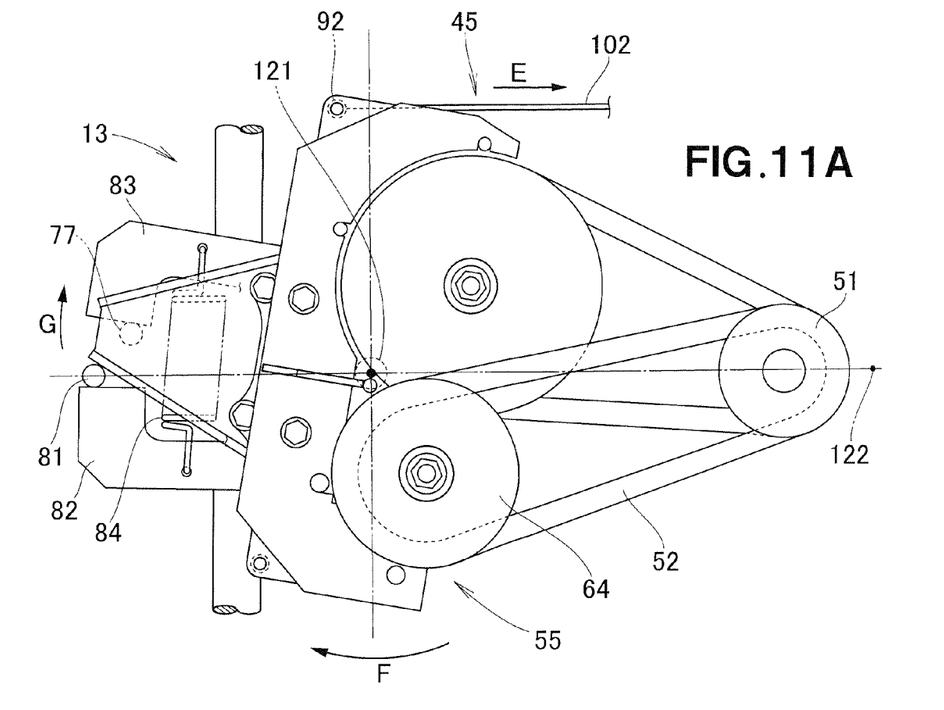
FIGS. 11A is a plan view illustrative of a manner in which the movable transmission part is actuated to undergo pivotal movement in one direction by means of the actuating mechanism.

When the inner wire 102 of the first cable 45 is pulled in the direction of an arrow B shown in FIG. 10A, the pin 92 on the upper transmission part 55 shown in FIG. 11A is pulled by the inner wire 102 of the first cable 45 as indicated by an arrow E shown in FIG. 11A, thus causing the upper transmission part 55 of the transmission 13 to turn about the axis of the drive shaft 121 in a clockwise direction indicated by an arrow F shown in FIG. 11A. With this clockwise movement of the upper transmission member 55, the V-belt 52 is brought to a stretched state, while the V-belt 53 is brought to a slacked state.

At the same time, the clockwise movement of the upper transmission part 55 causes the positioning pin 77 to force the right position holding plate 83 in a direction away from the left position holding plate 82 against the force of the tension coil spring 84, thereby turning the right position holding plate 83 in a clockwise direction about the axis of the drive shaft 121 as indicated by an arrow G shown in FIG. 11A. The tension coil spring 84 undergoes elongation against the resiliency thereof as an amount of clockwise movement of the right position holding plate 83 increases, and this elongation will allow the tension coil spring 84 to spring back to recover its original shape and configuration when a pull on the pin 92 is released.

Figure 11B:
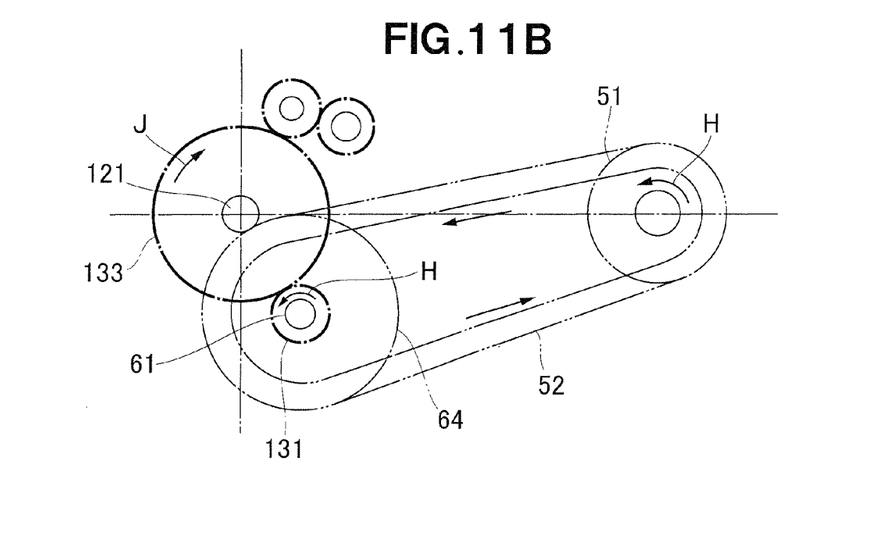
FIG. 11B is a diagrammatical view showing a power transmission path created when the movable power transmission part is disposed in the position shown in FIG. 11A.

When the V-belt 52 is brought to the stretched state, rotation of the driving pulley 51 in a counterclockwise direction indicated by an arrow H shown in FIG. 11B is transmitted by the V-belt 52 to the first pulley 64, so that the first driving gear 131 mounted on the first input shaft 61 rotates in a counterclockwise direction as indicated by an arrow H shown in FIG. 11B, and the driven gear 133, which is in driven mesh with the driving gear 131, rotates in a clockwise direction as indicated by an arrow J shown in FIG. 10B. With this clockwise rotation of the driven gear 133, the snow removing machine 10 propels in a forward direction.

When the forward movement of the snow removing machine 10 (FIG. 1) is to be stopped, a grip on the lock lever 43 is released to thereby unlock the forward/reverse travel switching lever 42 whereupon the forward/reverse travel switching lever 42 automatically returns from the solid-lined second position (forward traveling position) shown in FIG. 10B to the chain-lined first position (neutral position) shown in FIG. 10A by a combined spring force of the tension coil springs 84 and 94 shown in FIG. 2.

Figure 12A:
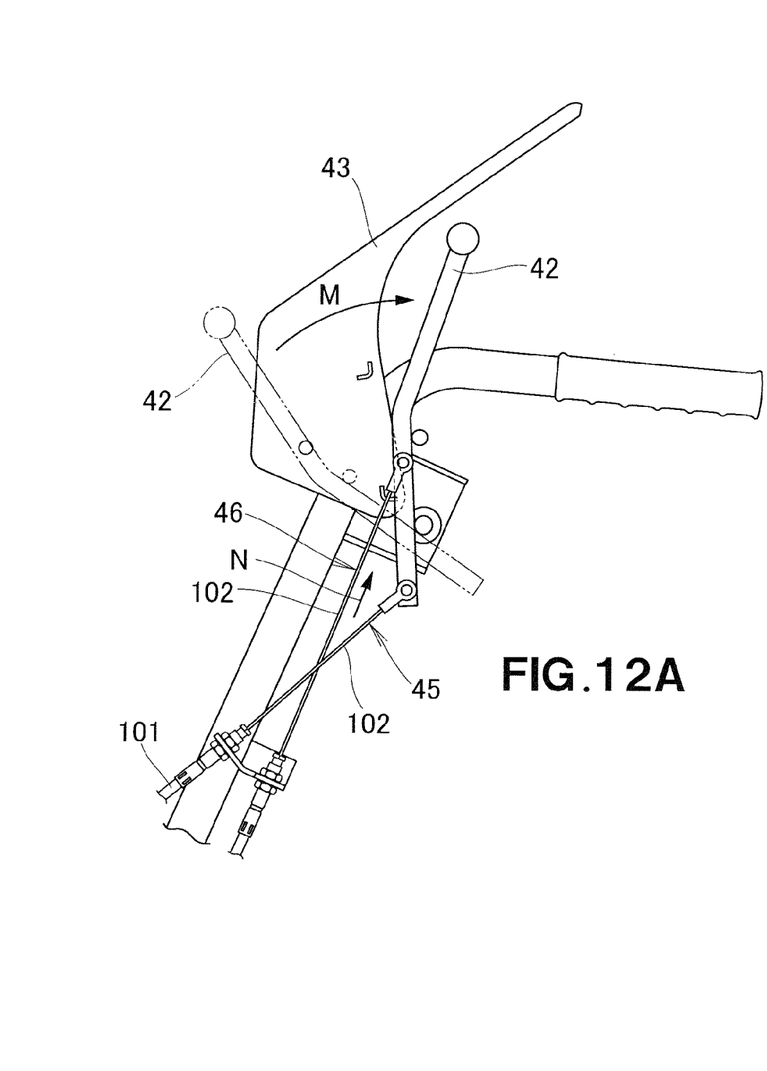
FIGS. 12A and 12B are diagrammatical side views illustrative of an operation of the transmission in conjunction with an operation of the part of the actuating mechanism associated with the handlebar of the snow removing machine when the snow removing machine is to be activated to travel backward.

When the snow removing machine is to be activated to travel in a backward or reverse direction, the forward/reverse travel switching lever 42 is tilted upward as indicated by an arrow M shown in FIG. 12A to move from the chain-lined neutral position to a third position indicated by solid lines shown in FIG. 12A. With this movement of the forward/reverse travel switching lever 42, the inner wire 102 of the second cable 46 is pulled as indicated by an arrow N shown in FIG. 12A, and an inner wire 102 of the first cable 45 is drawn into the outer cable 101 of the first cable 45.

Figure 12B:
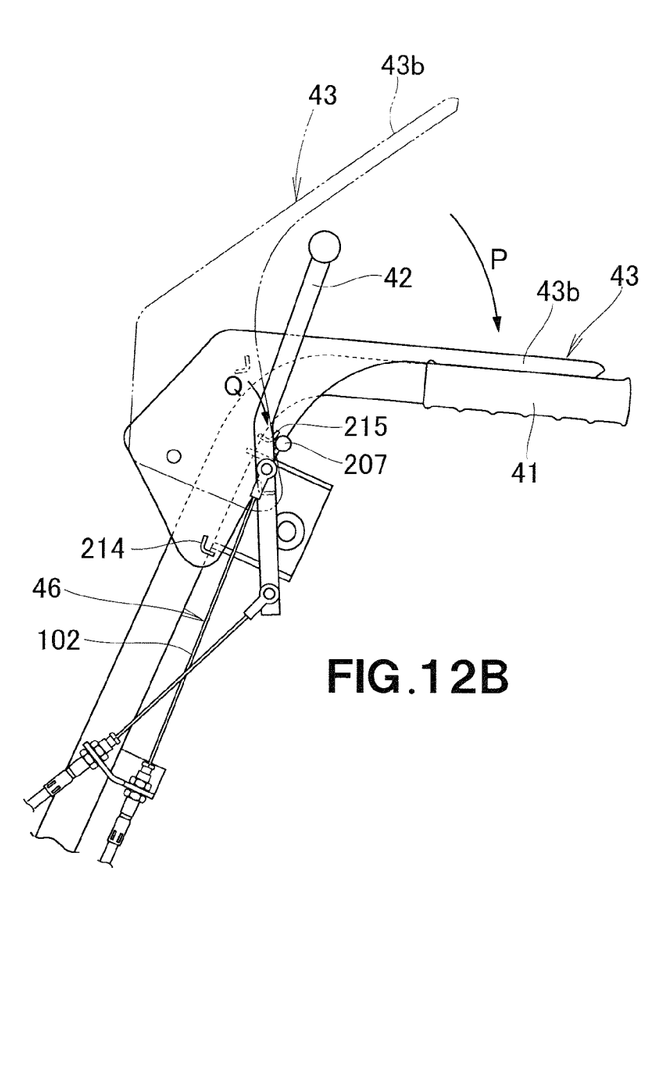

While the forward/reverse travel switching lever 42 is kept in the solid-lined upwardly tilted third position, the lock lever 43 is tilted down toward the grip 41 as indicated by an arrow P shown in FIG. 12B until it assumes the recumbent position lying flat on the grip 41 as indicated by solid lines shown in FIG. 12B. The lock lever 43 and the grip 41 of the right handlebar 23 are then gripped with a right hand of the human operator. With this movement of the lock lever 43, the locking lug 215 of the lock lever 43 is brought into locking engagement with the locked portion 207 of the forward/reverse travel switching lever 42 as indicated by an arrow Q shown in FIG. 12B, so that the forward/reverse travel switching lever 42 is prevented from returning back toward the chain-lined first position (neutral position) shown in FIG. 12A. Thus, the forward/reverse travel switching lever 42 is locked in the solid-lined third position of FIG. 12B against pivotal movement in a counterclockwise direction shown in FIG. 12B.

Figure 13A:
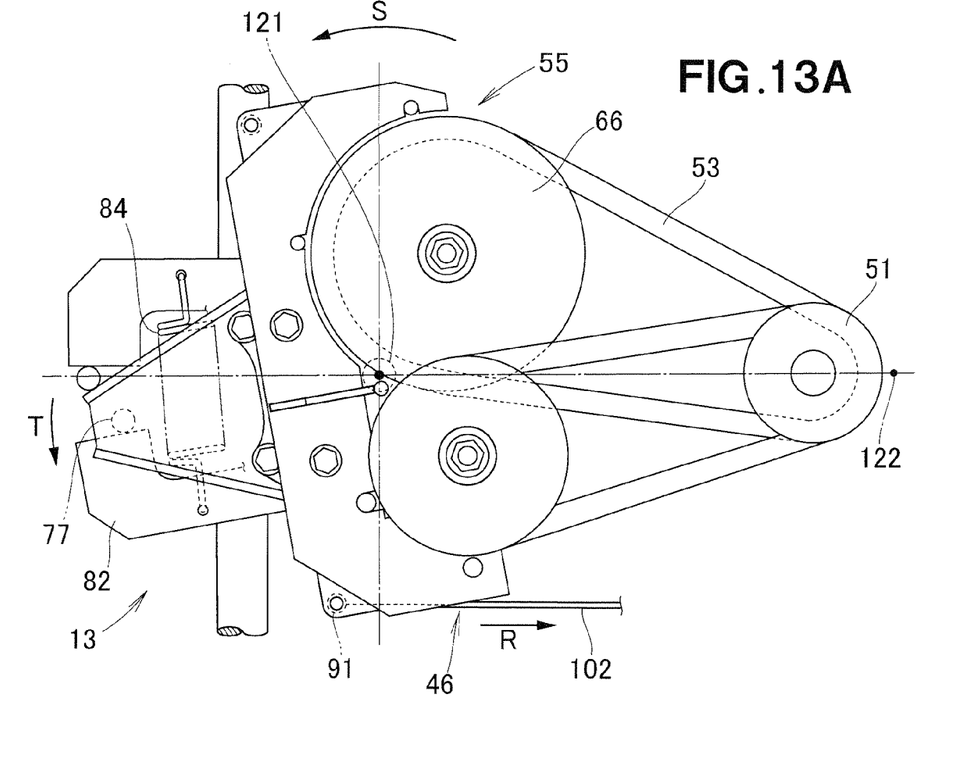
FIG. 13A is a plan view illustrative of a manner in which the movable transmission part is actuated to undergo pivotal movement in an opposite direction by means of the actuating mechanism.

When the inner wire 102 of the second cable 46 is pulled in the direction of arrow N shown in FIG. 12A, the pin 91 on the upper transmission part 55 shown in FIG. 13A is pulled by the inner wire 102 of the second cable 46 as indicated by an arrow R shown in FIG. 13A, causing the upper transmission part 55 of the transmission 13 to turn about the axis of the drive shaft 121 in a counterclockwise direction indicated by an arrow S shown in FIG. 13A. With this counterclockwise movement of the upper transmission member 55, the V-belt 53 is brought to a stretched state between the driving pulley 51 and the second pulley 66, while the V-belt 52 is brought to a slacked state.

At the same time, the counterclockwise movement of the upper transmission part 55 causes the positioning pin 77 to force the left position holding plate 82 in a direction away from the right position holding plate 83 against the force of the tension coil spring 84, thereby turning the left position holding plate 82 in a counterclockwise direction about the axis of the drive shaft 121 as indicated by an arrow T shown in FIG. 13A. The tension coil spring 84 undergoes elongation against the resiliency thereof as an amount of 5 counterclockwise movement of the left position holding plate 82 increases, and this elongation will allow the tension coil spring 84 to spring back to recover its original shape and configuration when a pull on the pin 91 is released.

Figure 13B:
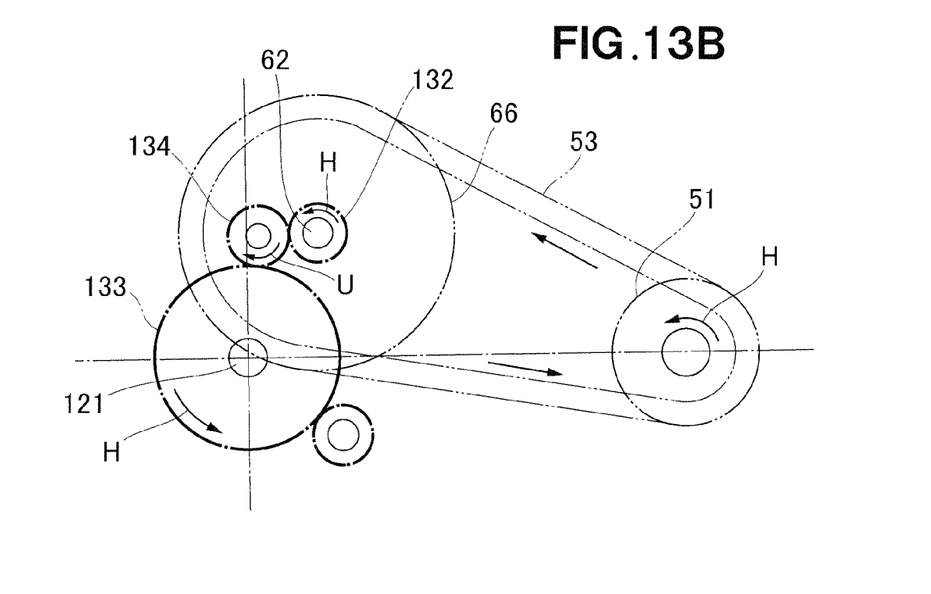
FIG. 13B is a diagrammatical view showing a power transmission path created when the movable power transmission part is disposed in the position shown in FIG. 13A.

When the V-belt 53 is brought to the stretched state, rotation of the driving pulley 51 in a counterclockwise direction indicated by the arrow H shown in FIG. 13B is transmitted by the V-belt 53 to the second pulley 66, so that the second driving gear 132 mounted on the second input shaft 62 rotates in a counterclockwise direction as indicated by the arrow H shown in FIG. 13B, the idler gear 134, which is is in mesh with the second driving gear 132, rotates in a clockwise direction as indicated by an arrow U shown in FIG. 13, and the driven gear 133, which is in mesh with the idler gear 134, rotates in a counterclockwise direction as indicated by the arrow H shown in FIG. 13B. With this counterclockwise rotation of the driven gear 133, the snow removing machine 10 moves backward.

When the backward or reverse movement of the snow removing machine 10 (FIG. 1) is to be stopped, a grip on the lock lever 43 is released to thereby unlock the forward/reverse travel switching lever 42 whereupon the forward/reverse travel switching lever 42 automatically returns from the solid-lined third position (reverse traveling position) shown in FIG. 12B to the chain-lined first position (neutral position) shown in FIG. 12A by a combined spring force of the tension coil springs 84 and 94 shown in FIG. 2.

Although in the illustrated embodiment discussed above, the hollow cylindrical connecting portion 143a of the movable upper transmission part 55 is loosely received in the hollow cylindrical connecting portion 162a of the fixed lower transmission part 56 with the single seal member 168 disposed between the connecting portions 143a, 162a of the upper and lower transmission parts 55, 56, as shown in FIG. 5, it is possible according to the present invention to arrange the connecting portions 143a, 162a such that the connecting portion 162 of the fixed lower transmission part 56 has an outside diameter smaller than an inside diameter of the connecting portion 143b of the movable upper transmission part 55 and is loosely received in the connecting portion 143b of the movable upper transmission part 55. Furthermore, the breather pipe 192 shown in FIG. 6 may be connected directly to, or formed integrally with, the cap 151. By thus arranging the breather pipe 192, the vertical hole 144e formed in the upper housing member 144 for receiving therein an end of the breather pipe 192 can be omitted and further reduction in the number of necessary components of the transmission can be achieved.

With the arrangements so far described, the present invention can be used advantageously as a transmission incorporated in a small-sized snow removing machine.

Obviously, various minor changes and modifications of the present invention are possible in light of the above teaching. It is therefore to be understood that within the scope of the appended claims the invention may be practiced otherwise than as specifically described.

What is claimed is:

1. A transmission comprising:
    a fixed transmission part having an internal space defined therein;
    a movable transmission part having an internal space defined therein, the movable transmission part being movably connected to the fixed transmission part via a shaft such that the movable transmission part is pivotally movable relative to the fixed transmission part about an axis of the shaft, the shaft being rotatably mounted to the fixed and movable transmission parts,
    wherein the fixed transmission part has a hollow cylindrical first connecting portion through which the shaft extends, and the movable transmission part has a hollow cylindrical second connecting portion through which the shaft extends, and
    wherein one of the first connecting portion and the second connecting portion is received in the other of the first and second connecting portions with a single seal member disposed between the first and second connecting portions so that the internal space of the fixed transmission part and the internal space of the movable transmission part communicate with each other to thereby form a single hermetically-sealed space for holding therein a lubricating oil; and
    a position holding mechanism for holding the movable transmission part in a predetermined rotational position relative to the fixed transmission part, wherein the position holding mechanism has a positioning pin provided on the movable transmission part and extending parallel to the shaft, a reference pin provided on the fixed transmission part and extending parallel to the shaft, a pair of position holding plates pivotally connected at one end to a portion of the movable transmission part for undergoing pivotal movement about the axis of the shaft, the pair of position holding plates being configured to hold the positioning pin and the reference pin at an opposite end thereof, and a spring acting between the pair of position holding plates to urge the pair of position holding plates toward each other.

2. The transmission of claim 1, wherein the movable transmission part is disposed above the fixed transmission part and has a breather chamber defined therein and connected with the single hermetically-sealed space in the transmission, and a breather passage for communicating the breather chamber with the air outside the transmission.

3. The transmission of claim 2, wherein the breather passage includes a breather pipe having one end connected to the breather chamber, and a breather hose having one end connected to another end of the breather pipe and another end facing in a vertical downward direction.

* * * * *